Figure 1:
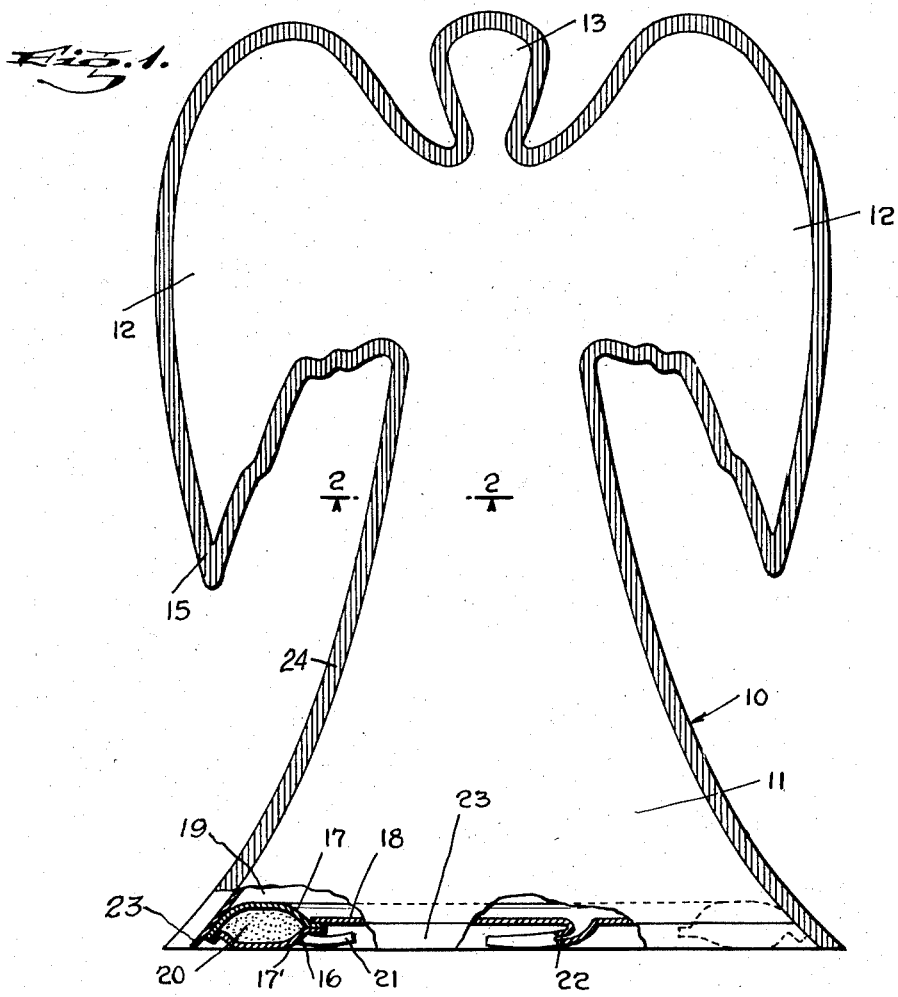

Dec. 9, 1958   M. FRANKEL   2,863,416
VEHICLE ROAD SIGNAL
Filed Dec. 30, 1955

INVENTOR.
MORRIS FRANKEL
BY
ATTORNEY

United States Patent Office 2,863,416
Patented Dec. 9, 1958

2,863,416

VEHICLE ROAD SIGNAL

Morris Frankel, Teaneck, N. J.

Application December 30, 1955, Serial No. 556,730

1 Claim. (Cl. 116—63)

This invention relates to a vehicle road signal, one of two of which is adapted for use in conjunction with each vehicle and positioned directly on a road a predetermined distance at the rear and to the front of a vehicle to signal drivers of other vehicles of the existence of a parked car at the side of the road.

More particularly, the invention deals with a signal device of the character described, which will have a predetermined contour, which contour, in itself, will signal to other vehicle drivers the existence of a definite and precise condition, so that drivers of approaching vehicles will be definitely warned as to what to expect and, accordingly, will slow down to meet any emergency which may prevail.

Still more particularly, the invention deals with a device of the character described in the form of an inflatable body which facilitates normal storage, packaging and shipment in a collapsed state and, then, quickly and easily extensible by inflation to an operable or use state.

Figure 2:
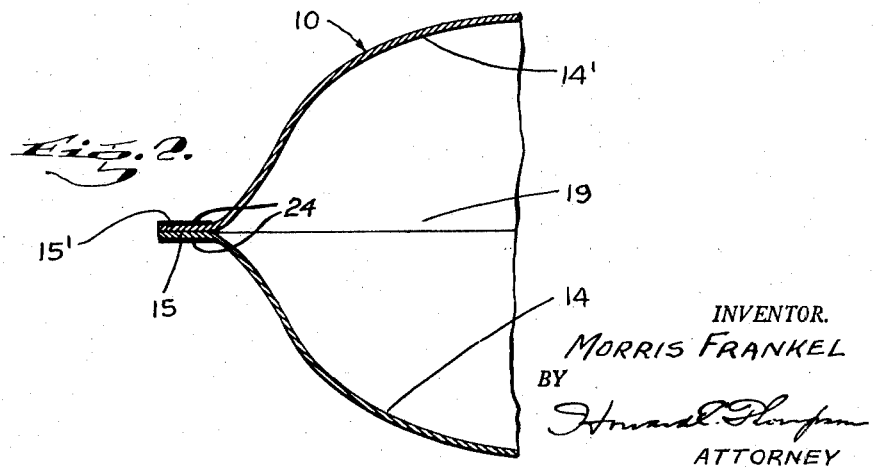

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a face view of a signal device made according to my invention, with part of the construction broken away and in section; and Fig. 2 is an enlarged partial section on the line 2—2 of Fig. 1.

In the operation of vehicles on roads and highways, one of the most serious conditions which have brought about numerous accidents and many deaths is the existence of a parked car at the side of a roadway, the car being so parked by virtue of tire trouble, engine stalling or for other reasons, and no means has been provided to definitely and positively signal approaching cars of the existence of this condition on the roadway.

The purpose of my invention is to provide a very specially characterized device which, if standardized, can come to definitely signal to the drivers of vehicles of the existence of a specific condition existing on the road. In other words, it is the intent and purpose to provide a signal which is just as standardized as many known road signals to indicate specific road conditions, such as curves, railroad crossings and the like.

Further, it is the object of my invention to also provide a signal device which will have distinct contour and outline and so constructed as to be clearly visible both during the day and at night, so as to be readily seen by approaching cars. Further, it is desirable to provide a device of this type and kind which can be stored in a vehicle in a compact state and, then, quickly and easily inflated to an enlarged or use state, thus rendering the device practical in use, as well as practical in packaging, sale and transportation.

Still further, it is desirable to provide a device of the kind under consideration, which can be produced at a nominal cost, so as to not unduly tax the operator of vehicles in obtaining and putting into use devices of the kind under consideration.

In illustrating an adaptation and use of my invention, I have shown, in the accompanying drawing, a signal device 10, which, when inflated and in operative use, has the outline of an angel. 11 represents the substantially conical body or skirt portion, 12 the wings in a partially spread condition and 13 the head. In the construction shown, these parts are made from two sheets 14, 14' of any suitable flexible plastic material, edge portions 15, 15' of which are heat sealed or otherwise secured together throughout the side and upper boundaries of the sheets, as is clearly noted in Fig. 1 of the drawing.

In practice, the sheets 14, 14' will preferably be composed of one color, such for example as white, which can be readily seen during the day or night and these sheets can have slight characterizations thereon, if desired. However, plain sheets can be used.

The edge portions 15, 15' will, however, be coated, preferably with a luminous material of a dark color, so that the outline of the device can be readily seen both in the daytime and at night.

At the base of the device and at the periphery of the skirt or body 11 is an annular tube 16, preferably formed from inner and outer sheets 17, 17' of suitable plastic material and to the inside diameter of the tube 16 is secured a bottom sheet 18 which forms a closure for the inflatable chamber 19 of the device, the chamber 19 extending into the wings 12 and head 13. The tube 16 is adapted to contain any type and kind of weighting material, such as particles, crystals or the like 20, which can be in the form of sand, salt, small shot and the like, the purpose of which is to securely maintain the device on a roadway in an upright condition. By providing a flexible tube 16, the base will substantially conform to the contour of the roadway, upon which the device is placed.

While the tube 16 can be pre-loaded with the weighting material 20, it is preferred that an admission tube 21 be provided for filling the tube 16 with the weighting material in question, so that, in merchandising the device, the weight factor can be kept at a minimum. It will also appear that the bottom wall 18 includes an inflating tube or element 22 for inflating the sealed chamber 19, so that the various parts of the device are extended, as with other inflated devices of this type and kind. The element 22 can simply be in the form of a tube, which facilitates manual or mechanical introduction of air for purposes of inflation, or this element may constitute a standard type of inflating element, as are well known in the art.

It will also appear that the lower portion of the device 10 includes an outwardly flared flexible flange 23 of plastic or other material adapted to fit snugly upon the roadway and substantially conform thereto to act as a shield or guard, preventing heavy air currents, which might prevail in a strong wind, from entering beneath the device. In this connection, it will be understood, however, that the nature of the device with the weighted bottom will be such as to maintain the upright position under all normal conditions.

The edge portions 15, 15' form what may be termed a thin flange bordering the periphery of the entire inflatable device, as is clearly shown in Fig. 1 of the drawing and illustrated in Fig. 2 in section. Exposed surfaces of the portions 15, 15' forming said flange have the coatings of luminous paint or other material thereon, which is diagrammatically noted by the heavy line of surfaces of 15, 15' of Fig. 2 and designated by the reference character 24. This has also been noted by the red shading 24 in Fig. 1 of the drawing, the dark color being preferably employed so as to be visible in the daytime, as well as at night.

In the use of the device, preferably two of the devices are, at all times, stored in the vehicle to be available for use in the event of the necessity of the operator to park the vehicle along the roadway.

When such parking is necessary, the operator will first inflate one of the devices and then travel seventy-five to one hundred paces to the rear of the vehicle and place the signal device on the roadway on his side of the roadway reasonably close to the shoulder of the roadway. The other device is then inflated and placed at the front of the vehicle also approximately seventy-five to one hundred paces at the front of the vehicle and preferably positioned in line with the left side of the roadway upon which he is travelling. Where division road lines prevail, the signal device can be placed on this division line.

With these markers so positioned on a roadway, it will be apparent that approaching vehicles coming in either direction will have a definite and clear warning that a parked car is ahead and, accordingly, will slow down, thus avoiding accidents.

In some instances, particularly, where the operator of the vehicle contemplates taking a long motor trip, it would be desirable for the operator to inflate his road signals prior to making a trip, so as to have these signals available for quick placement on the road if an occasion should arise to have to use the same.

Having fully described my invention, what I claim as new and desire to secure by Letters Patent is:

A device of the character described, comprising a hollow body of predetermined irregular peripheral contour, the body being formed from two similar thin sheets of flexible and inflatable plastic material, peripheral edges of said sheets being secured together in the form of a thin flange at edge portions bordering the sides and top only of the body, said edge portions having luminous material thereon to render said peripheral edges of the body readily noticeable, the body having a flared base portion, weighting means, within the peripheral portion only of the flared base portion, for holding the inflated body in upright position, and an inflating element attached to said body.

References Cited in the file of this patent

UNITED STATES PATENTS

| | | |
|---|---|---|
| 2,561,016 | Ford | July 17, 1951 |
| 2,762,327 | Weig | Sept. 11, 1956 |